(12) United States Patent
Kodaira et al.

(10) Patent No.: US 12,076,895 B2
(45) Date of Patent: Sep. 3, 2024

(54) MOLD AND MOLDING SYSTEM

(71) Applicant: Canon Virginia, Inc., Newport News, VA (US)

(72) Inventors: Koki Kodaira, Tokyo (JP); Yuichi Yanahara, Moriyama (JP)

(73) Assignee: Canon Virginia, Inc., Newport News, VA (US)

( * ) Notice: Subject to any disclaimer, the term of this patent is extended or adjusted under 35 U.S.C. 154(b) by 1 day.

(21) Appl. No.: 17/611,352

(22) PCT Filed: May 13, 2020

(86) PCT No.: PCT/US2020/032739
§ 371 (c)(1),
(2) Date: Nov. 15, 2021

(87) PCT Pub. No.: WO2020/236491
PCT Pub. Date: Nov. 26, 2020

(65) Prior Publication Data
US 2022/0219362 A1    Jul. 14, 2022

Related U.S. Application Data

(60) Provisional application No. 62/849,725, filed on May 17, 2019.

(51) Int. Cl.
*B29C 45/17* (2006.01)
*B29C 45/04* (2006.01)

(52) U.S. Cl.
CPC ...... *B29C 45/1775* (2013.01); *B29C 45/0416* (2013.01); *B29C 45/1756* (2013.01)

(58) Field of Classification Search
CPC ............ B29C 45/1775; B29C 45/0416; B29C 45/1756
See application file for complete search history.

(56) References Cited

U.S. PATENT DOCUMENTS 4,810,181 A    3/1989   Ozawa
5,063,648 A   11/1991   Yonezawa et al.
(Continued)

FOREIGN PATENT DOCUMENTS

CN    103895176 A      7/2014
DE   102005030700 B3   1/2007
(Continued)

OTHER PUBLICATIONS

Lee Lechner Oct. 12, 2020 Injection Molding Basics: Cold Runner Systems from Injection Molding Basics: Cold Runner systems by innovation by design Home Blog https:///echosupply.com/blog (Year: 2020).*

(Continued)

*Primary Examiner* — Jacob T Minskey
*Assistant Examiner* — Wayne K. Swier
(74) *Attorney, Agent, or Firm* — Canon U.S.A., Inc., IP Division

(57) ABSTRACT

A mold for an injection molding system including an injection molding machine, a conveying apparatus configured to convey a mold to a molding operation position in the injection molding machine, and a driving unit configured to provide power for moving the mold, the mold including a fixed mold, a movable mold, and a clamping plate fixed to the fixed mold, wherein the improvement to the mold includes a first attachment area for transmitting the power from the driving unit to the mold is provided on the clamping plate and in an extending portion that extends downward from the fixed mold or on the clamping plate and in a protruding portion that protrudes from the fixed mold in a conveyance direction of the mold and located lower than a middle of the clamping plate.

16 Claims, 8 Drawing Sheets

(56) References Cited

U.S. PATENT DOCUMENTS

| | | |
|---|---|---|
| 11,000,981 B2 | 5/2021 | Hien et al. |
| 11,104,050 B2 | 8/2021 | Nakamura |
| 2006/0083814 A1 | 4/2006 | Mai |
| 2007/0087078 A1 | 4/2007 | Franken |
| 2008/0193586 A1 | 8/2008 | Araujo |
| 2009/0169674 A1 | 7/2009 | Kimura |
| 2012/0049408 A1 | 3/2012 | Okamoto |
| 2014/0077416 A1 | 3/2014 | Halter |
| 2018/0009146 A1 | 1/2018 | Nakamura |
| 2020/0039131 A1 | 2/2020 | Hien et al. |

FOREIGN PATENT DOCUMENTS

| | | |
|---|---|---|
| DE | 102005049640 A1 | 4/2007 |
| EP | 0371710 A2 | 6/1990 |
| EP | 0578514 A1 | 1/1994 |
| FR | 1228490 A | 8/1960 |
| JP | S5377255 A | 7/1978 |
| JP | H03-029310 U | 3/1991 |
| JP | H09201856 A | 8/1997 |
| JP | 2004299061 A | 10/2004 |
| JP | 2007320065 A | 12/2007 |
| JP | 6084599 B2 | 2/2017 |
| JP | 6121601 B1 | 4/2017 |
| JP | 6460507 B1 | 1/2019 |
| JP | 6460508 B1 | 1/2019 |
| WO | 0103904 A1 | 1/2001 |

OTHER PUBLICATIONS

Machine translation JP2004299061A (Year: 2004).*
Machine translation DE102005049640A1 (Year: 2007).*
Green Valley Manufacturing Inc., "Titan Mold Change Cart 2898 4000 lb. Capacity", Internet Retrieval (Dec. 21, 2022): URL:https://www.youtube.com/watch?v=1czQtdAHwJ0, Dec. 20, 2012, XP93010419.
Green Valley Manufacturing Inc., "Titan Mold Shuttle 2218—15,000 lb. Capacity Shuttle Table", Internet Retrieval (Dec. 21, 2022): URL:https://www.youtube.com/watch?v=1cgU0mECsuN0, May 21, 2009, XP93010420A.

* cited by examiner

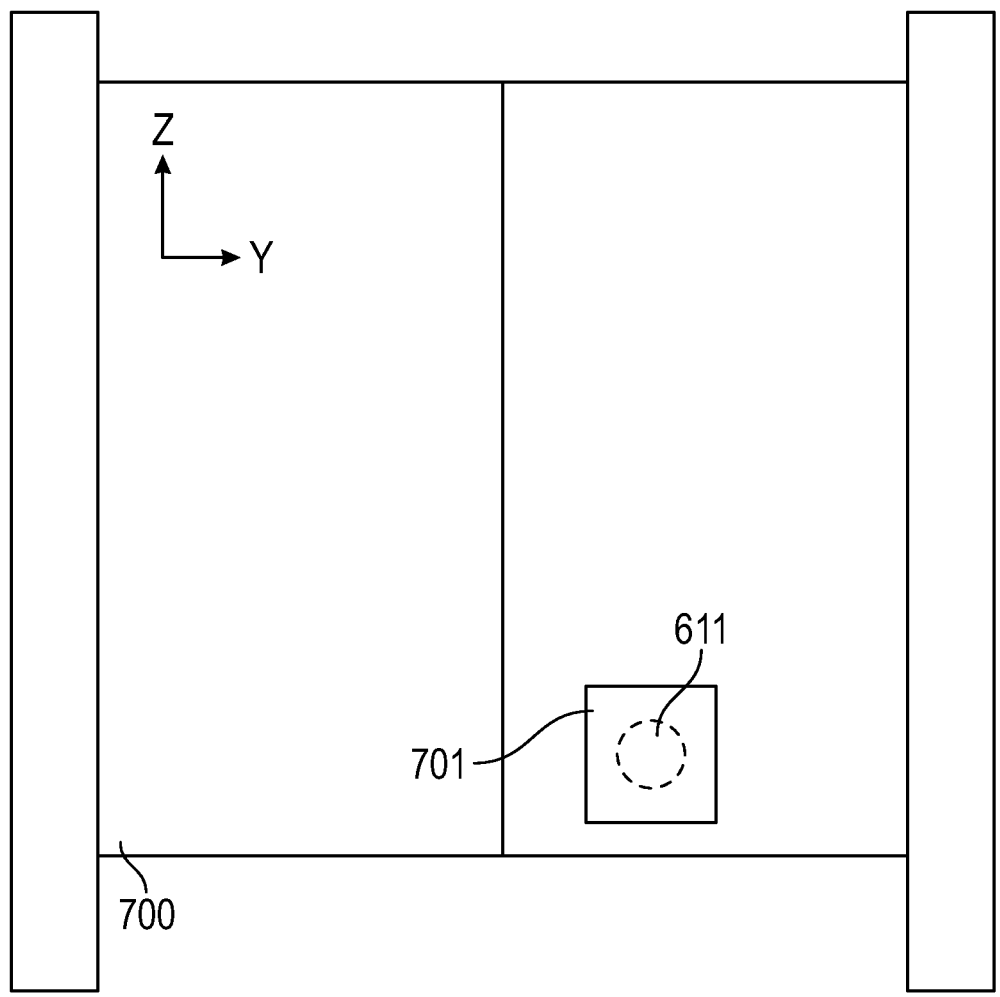
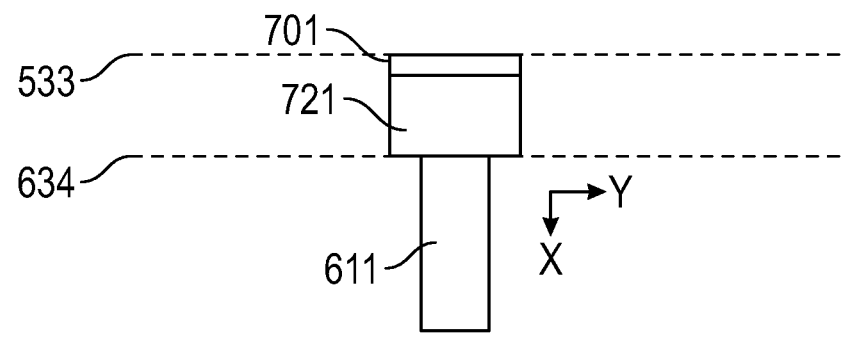
FIG. 7

MOLD AND MOLDING SYSTEM

CROSS-REFERENCE TO RELATED APPLICATION

This application claims the benefit of U.S. Provisional Application 62/849,725, which was filed on May 17, 2019.

FIELD

The present disclosure relates to an injection molding system.

BACKGROUND

Manufacturing of molded parts by an injection molding machine includes injecting a resin into a mold after clamping the mold, pressing the resin into the mold at a high pressure in order to compensate for a volume decrease due to solidification of the resin, keeping the molded part in the mold until the resin solidifies, and ejecting the molded part from the mold.

In the above-described molding approach, a method that uses two molds with one injection molding machine in order to enhance productivity has been proposed. For example, US 2018/0009146/Japanese patent publication No. 2018-001738/VN20160002505 are seen to discuss a system in which conveying devices 3A and 3B are arranged on both sides of an injection molding machine 2. In this system, molded parts are manufactured while alternating a plurality of molds by the conveying devices 3A and 3B for the one injection molding machine 2. FIG. 1 illustrates an injection molding system of US 2018/0009146/Japanese patent publication No. 2018-001738/VN20160002505.

In this system, cooling of the molds 100A or 100B is performed on the conveying machines 3A or 3B outside of the injection molding machine 2. During cooling of one of the molds 100A/100B, each process of molded part ejection→clamping→injection/dwelling is performed by the injection molding machine 2 for the other mold 100A/100B. Since opening and molded part ejection are performed by the injection molding machine 2, the conveying machines 3A and 3B do not need a function for opening and a function for molded part ejection.

This enables manufacture of the molded part P while alternating the plurality of the molds by the one injection molding machine 2. This can reduce the overall cost of the system.

If the time required for all processes from the start of the mold replacement process, to the other mold ejecting process, injection process, and dwelling process, and up until completion of the mold replacement process once again fits into the time required for cooling one of the molds, then productivity compared to normal molding is improved by a maximum of two times. That is, in addition to suppressing cost increases, there is the merit that it is possible to realize high productivity.

A technique for heat and cool molding is known. In this technique, the mold is heated in advance to a temperature higher than the thermal deformation temperature of the resin, and after the resin is injected into the mold, the mold is cooled. While this technique can prevent appearance defects of molded parts, it requires an apparatus for forced heating and cooling. In addition, there is a disadvantage that the molding process is longer than that of a typical molding method.

What is needed is a technique for heat and cool molding in an injection molding system where multiple molds are alternated.

SUMMARY

According to at least one aspect of the present disclosure, a mold for an injection molding system including an injection molding machine, a conveying apparatus configured to convey a mold to a molding operation position in the injection molding machine, and a driving unit configured to provide power for moving the mold, the mold including a fixed mold, a movable mold, and a clamping plate fixed to the fixed mold, wherein the improvement to the mold includes a first attachment area for transmitting the power from the driving unit to the mold is provided on the clamping plate and in an extending portion that extends downward from the fixed mold or on the clamping plate and in a protruding portion that protrudes from the fixed mold in a conveyance direction of the mold and located lower than a middle of the clamping plate.

This and other embodiments, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

FIGS. 5-7 illustrate an attachment for fixing a rod of a conveyance unit with the linking unit.

Figure 1:
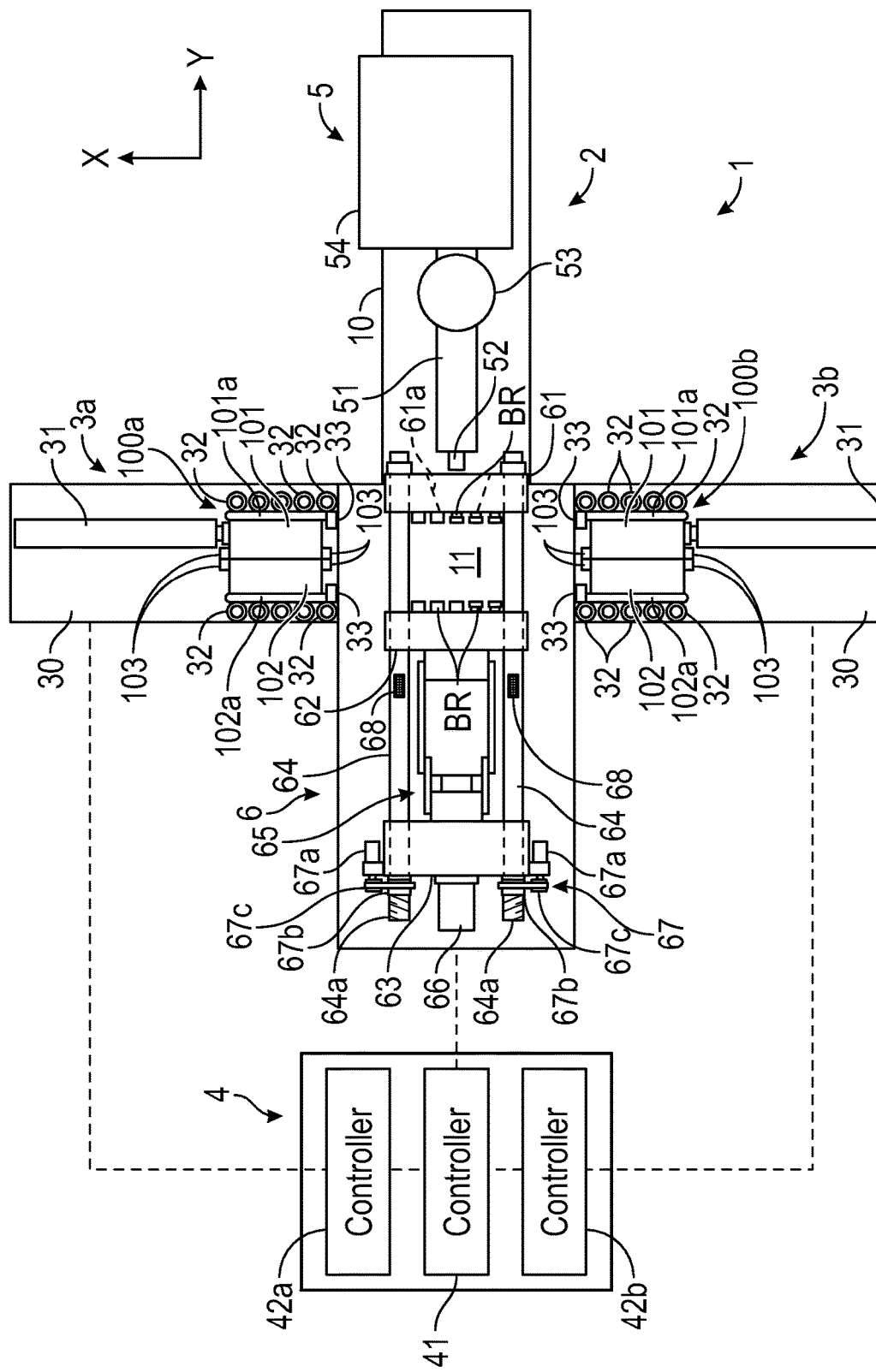
FIG. 1 illustrates an injection molding system.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DESCRIPTION OF EXEMPLARY EMBODIMENTS

The present disclosure has several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

With reference to the drawings, the arrow symbols X and Y in each Figure indicate horizontal directions that are orthogonal to each other, and the arrow symbol Z indicates a vertical (upright) direction with respect to the ground.

FIG. 1 illustrates injection molding system 1 of US 2018/0009146/Japanese patent publication No. 2018-

001738/VN20160002505 and are being provided herein for information/description purposes only.

The injection molding system 1 includes an injection molding machine 2, conveying machines 3A and 3B, and a control apparatus 4. The injection molding system 1 manufactures a molded part while alternating a plurality of molds using the conveying machines 3A and 3B for the one injection molding machine 2. Two molds, 100A and 100B are used.

The mold 100A/100B is a pair of a fixed mold 101 and a movable mold 102, which is opened/closed in relation to the fixed mold 101. The molded part is molded by injecting a molten resin into a cavity formed between the fixed mold 101 and the movable mold 102. Clamping plates 101a and 102a are respectively fixed to the fixed mold 101 and the movable mold 102. The clamping plates 101a and 102a are used to lock the mold 100A/100B to a molding operation position 11 (mold clamping position) of the injection molding machine.

For the mold 100A/100B, a self-closing unit 103 is provided for maintaining a closed state between the fixed mold 101 and the movable mold 102. The self-closing unit 103 enables preventing the mold 100A/100B from opening after unloading the mold 100A/100B from the injection molding machine 2. The self-closing unit 103 maintains the mold 100A/100B in a closed state using a magnetic force. The self-closing unit 103 located at a plurality of locations along opposing surfaces of the fixed mold 101 and the movable mold 102. The self-closing unit 103 is a combination of an element on the side of the fixed mold 101 and an element on the side of the movable mold 102. For the self-closing unit 103, typically two or more pair are installed for one of the molds 100A and 100B.

A conveying machine 3A loads and unloads the mold 100A onto/from the molding operation position 11 of the injection molding machine 2. A conveying machine 3B loads and unloads the mold 100B onto/from the molding operation position 11. The conveying machine 3A, the injection molding machine 2, and the conveying machine 3B are arranged to be lined up in this order in the X-axis direction. In other words, the conveying machine 3A and the conveying machine 3B are arranged laterally with respect to the injection molding machine 2 to sandwich the injection molding machine 2 in the X-axis direction. The conveying machines 3A and 3B are arranged to face each other, and the conveying machine 3A is arranged on one side laterally of the injection molding machine 2, and the conveying machine 3B is arranged on the other side respectively adjacent. The molding operation position 11 is positioned between the conveying machine 3A and the conveying machine 3B. The conveying machines 3A and 3B respectively include a frame 30, a conveyance unit 31, a plurality of rollers 32, and a plurality of rollers 33.

The frame 30 is a skeleton of the conveying machine 3A and 3B, and supports the conveyance unit 31, and the pluralities of rollers 32 and 33. The conveyance unit 31 is an apparatus that moves the mold 100A/100B back and forth in the X-axis direction, and that removes and inserts the mold 100A/100B in relation to the molding operation position 11.

The conveyance unit 31 is an electrically driven cylinder with a motor as a driving source, and includes a rod that moves forward/backward in relation to the cylinder. The cylinder is fixed to the frame 30, and the fixed mold 101 is fixed to the edge portion of the rod. For the conveyance unit 31 both a fluid actuator and an electric actuator can be used, where the electric actuator can provide better precision of control of the position or the speed when conveying the mold 100A/100B. The fluid actuator can be an oil hydraulic cylinder, or an air cylinder, for example. The electric actuator can, in addition to an electrically driven cylinder, be a rack-and-pinion mechanism with a motor as the driving source, a ball screw mechanism with a motor as the driving source, or the like.

The conveyance unit 31 is arranged independently for each of the conveying machines 3A and 3B. However, a common support member that supports the molds 100A and 100B can be used, and a single common conveyance unit 31 can be arranged for this support member. A case where the conveyance unit 31 is arranged independently for each of the conveying machines 3A and 3B enables handling cases where a movement strokes differ between the mold 100A and the mold 100B when conveying. For example, a case in which molds cannot be conveyed simultaneously since the widths of the molds (the width in the X direction) differ or the thickness of the molds (the width in the Y direction) differ.

The plurality rollers 32 configure a row of rollers arranged in the X-axis direction, where two rows are configured separated in the Y-axis direction. The plurality of rollers 32 rotate around the axis of revolution in the Z-axis direction, and guide movement in the X-axis direction of the mold 100A/100B contacting the side surfaces of the mold 100A/100B (the side surfaces of the clamping plates 101a and 102a) and supporting the mold 100A/100B from the side. The plurality rollers 33 configure a row of rollers arranged in the X-axis direction, where two rows are configured separated in the Y-axis direction. The plurality of rollers 33 rotate around the axis of revolution in the Y direction, and cause movement in the X direction of the mold 100A/100B to be smooth, supporting the bottom surfaces of the mold 100A/100B (the bottom surfaces of the clamping plates 101a and 102a) and supporting the mold 100A/100B from below.

The control apparatus 4 includes a controller 41 for controlling the injection molding machine 2, a controller 42A for controlling the conveying machine 3A, and a controller 42B for controlling the conveying machine 3B. Each of the controllers 41, 42A and 42B includes, for example, a processor such as a CPU, a RAM, a ROM, a storage device such as a hard disk, and interfaces connected to sensors or actuators (not illustrated). The processor executes programs stored in the storage device. An example of a program (control) that the controller 41 executes is described below. The controller 41 is communicably connected with the controllers 42A and 42B, and provides instructions related to the conveyance of the mold 100A/100B to the controllers 42A and 42B. The controllers 42A and 42B, if loading and unloading of the mold 100A/100B terminates, transmit a signal for operation completion to the controller 41. In addition, the controllers 42A and 42B transmit an emergency stop signal at a time of an abnormal occurrence to the controller 41.

A controller is arranged for each of the injection molding machine 2, the conveying machine 3A, and the conveying machine 3B, but one controller can control all three machines. The conveying machine 3A and the conveying machine 3B can be controlled by a single controller for more reliable and collaborative operation.

FIGS. 2A-2D illustrate a configuration of a mold 100 according to conventional technology. For description purposes, reference number 100 will be used for the mold in the following description of FIGS. 2A-2D.

Figure 2A:
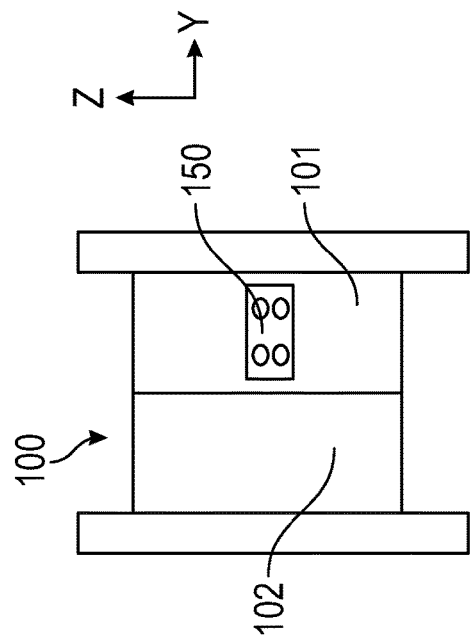
FIGS. 2A-2D illustrate a configuration of a mold.

FIG. 2A illustrates a perspective view of the mold 100. The mold 100 includes a fixed mold 101 and a movable mold 102. A clamping plate 101a is fixed to the fixed mold 101 and a clamping plate 102a is fixed to the movable mold 102. A linking unit 150 is attached to the fixed mold 101, and the fixed mold 101 is linked to the conveyance unit 31 via the linking unit 150.

Figure 2B:
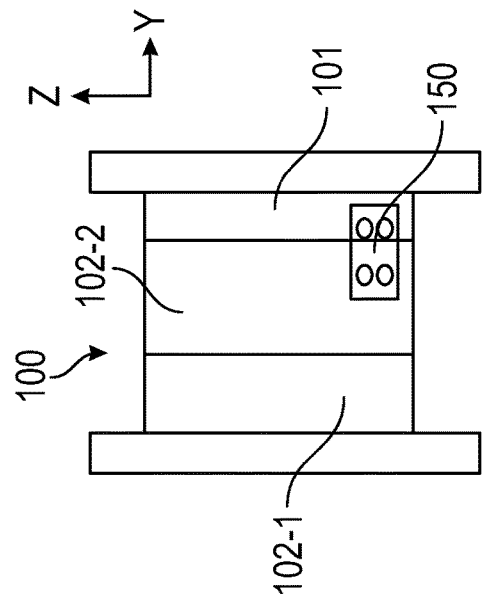

FIG. 2B illustrates the mold 100 as viewed from the direction of the conveyance unit 31 that is linked to the mold 100. An attachment area where the linking unit 31 is attached does not extend from the fixed mold 101 to the movable mold 102, so the linking unit 150 can be attached to a stable area on the fixed mold 101.

Figure 2C:
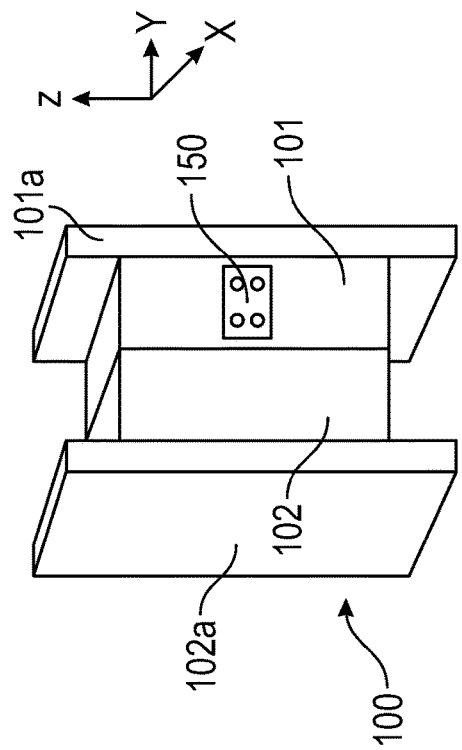

FIG. 2C illustrates a configuration where the fixed mold 101 is thicker than the movable mold 102. In this configuration, the attachment area extends from the fixed mold 101 to the movable mold 102, so the linking unit 150 cannot be attached to the stable area on the fixed mold 101.

Figure 2D:
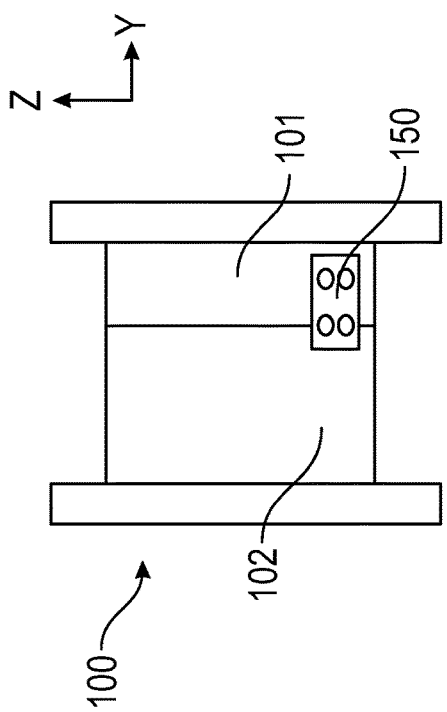

FIG. 2D illustrates a configuration of the mold 100 that handles a stack molding method. The mold 100 includes a fixed mold 101, a movable mold 102-1, and a movable mold 102-2. The stack molding method is a method where injection molding is performed at two places, a cavity is formed between the fixed mold 101 and the movable mold 102-1, and a cavity is formed between the movable mold 102-1 and the movable mold 102-2.

In a case of the configuration in FIG. 2D, the attachment area extends from the fixed mold 101 to the movable mold 102-2, so the linking unit 150 cannot be attached to the stable area on the fixed mold 101.

As described above, the configuration that the linking unit 150 is attached to the fixed mold 101 has an issue that it is difficult to handle various types of molds, like those illustrated in FIG. 2C and FIG. 2D.

FIGS. 3A-3D illustrate a mold according to an exemplary embodiment. For description purposes, only mold 100A will be described, but the present embodiment is applicable to mold 100B as well.

Figure 3A:
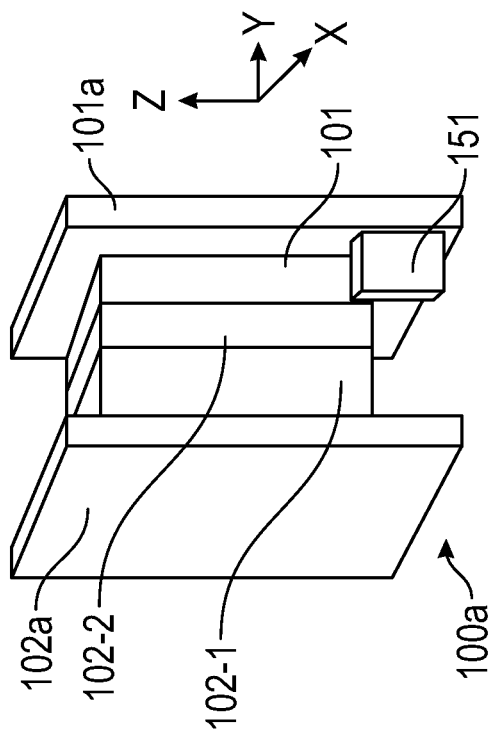
FIG. 3A illustrates a mold.

In FIG. 3A, the mold 100A includes a fixed mold 101, a movable mold 102-1, a movable mold 102-2, a clamping plate 101a, and a clamping plate 102a. The clamping plate 101a is fixed to the fixed mold 101, and the clamping plate 102a is fixed to the movable mold 102-1. The mold 100A includes three molds and can be used in the stack molding method.

In the present embodiment, the linking unit 151 is attached to the clamping plate 101a. The clamping plate 101a fixed to the fixed mold 101 and extends downward from the fixed mold 101. There is an attachment area in the extending portion is not illustrated in FIG. 3A because it is blocked from view by the linking unit 151. A structure that can be attached with the linking unit 151 is located in the attachment area. The structure can be a screw hole or where the linking unit 151 can fit.

The linking unit 151 is attached to the attachment area of the clamping plate 101a via a screw (not illustrated), and can easily be detached from the attachment area of the clamping plate 101a. This makes it convenient when the mold 100A is exchanged. With respect to the mold 100A as illustrated in FIG. 3A, there is a space at the bottom of the clamping plate 101a, where this space is used as the attachment area. Therefore, there is no need to customize the mold 100A for connection with the conveyance unit 31.

Figure 3B:
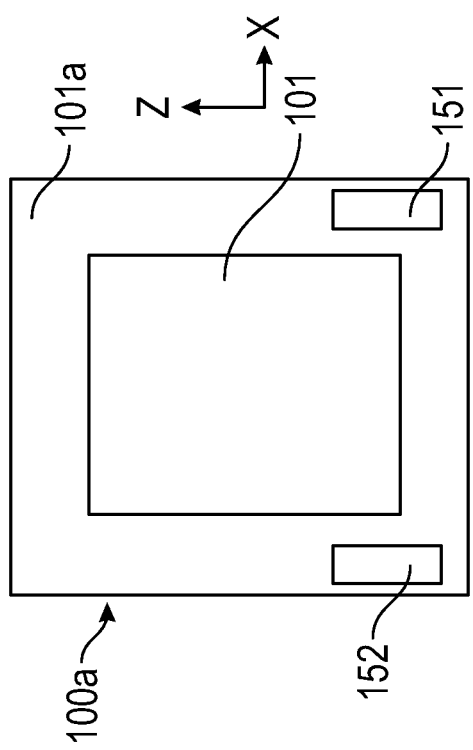
FIG. 3B illustrates a mold.

FIG. 3B illustrates another exemplary embodiment of the mold 100A. In the present embodiment, the clamping plate 101 fixed to fixed mold 101 protrudes in X-axis direction from the fixed mold 101. The protruding portion includes an attachment area. In a case where the mold 100A is smaller in size compared to the injection molding machine 2 is used, a space can exist in a lateral direction (X-axis direction) in the clamping plate 101a. This space is used as the attachment area. Therefore, there is no need to customize the mold 100A for connection with the conveyance unit 31.

If an actuator included in the conveyance unit 31 is provided below the mold 100A, it is better to provide the linking unit 151 at a position lower than the middle of the clamping plate 101A in a Z-axis direction for efficiently moving the mold 100A.

Figure 3C:
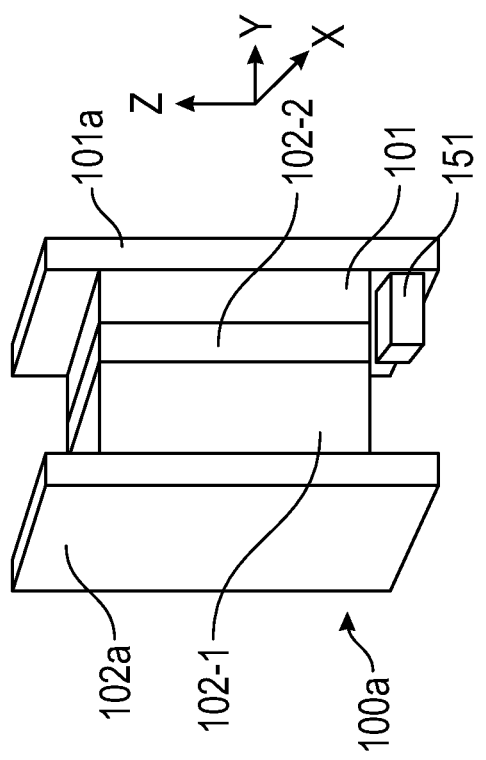
FIG. 3C illustrates a mold.
Figure 3D:
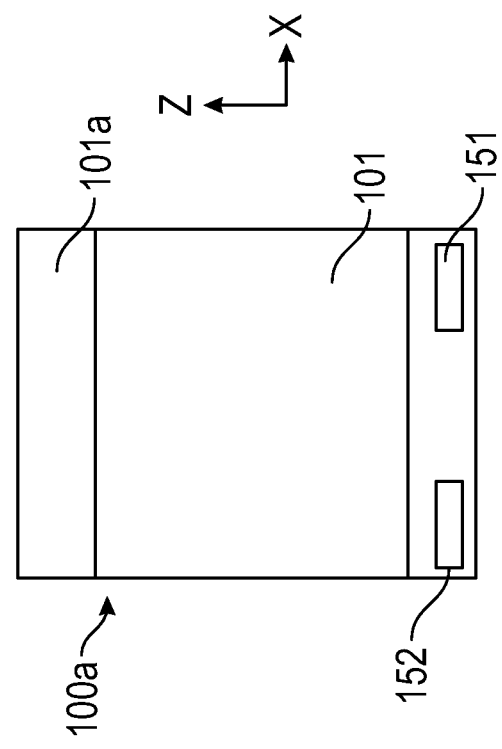
FIG. 3D illustrates a mold.

In the above-described embodiment, there are two conveyance units 31 in the injection molding system 1, but this is not seen to be limiting. In another exemplary embodiment, only one conveyance unit 31 can be provided to move the molds 100A and 100B. In this embodiment, an additional linking unit is provided between the molds 100A and 100B. FIG. 3C and FIG. 3D respectively illustrate the mold 100A in relation to the linking unit 151 and the linking unit 152, which are provided at both sides of the clamping plate 101A in the X-axis direction. FIG. 3C corresponds to FIG. 3A and FIG. 3D corresponds to FIG. 3B.

One of the linking units is used for linking the mold 100A and the conveyance unit 31, while the linking unit is used for linking the molds 100A and 100B. Variations of the linking unit in various types of molds is described below with respect to FIG. 4.

Figure 4:
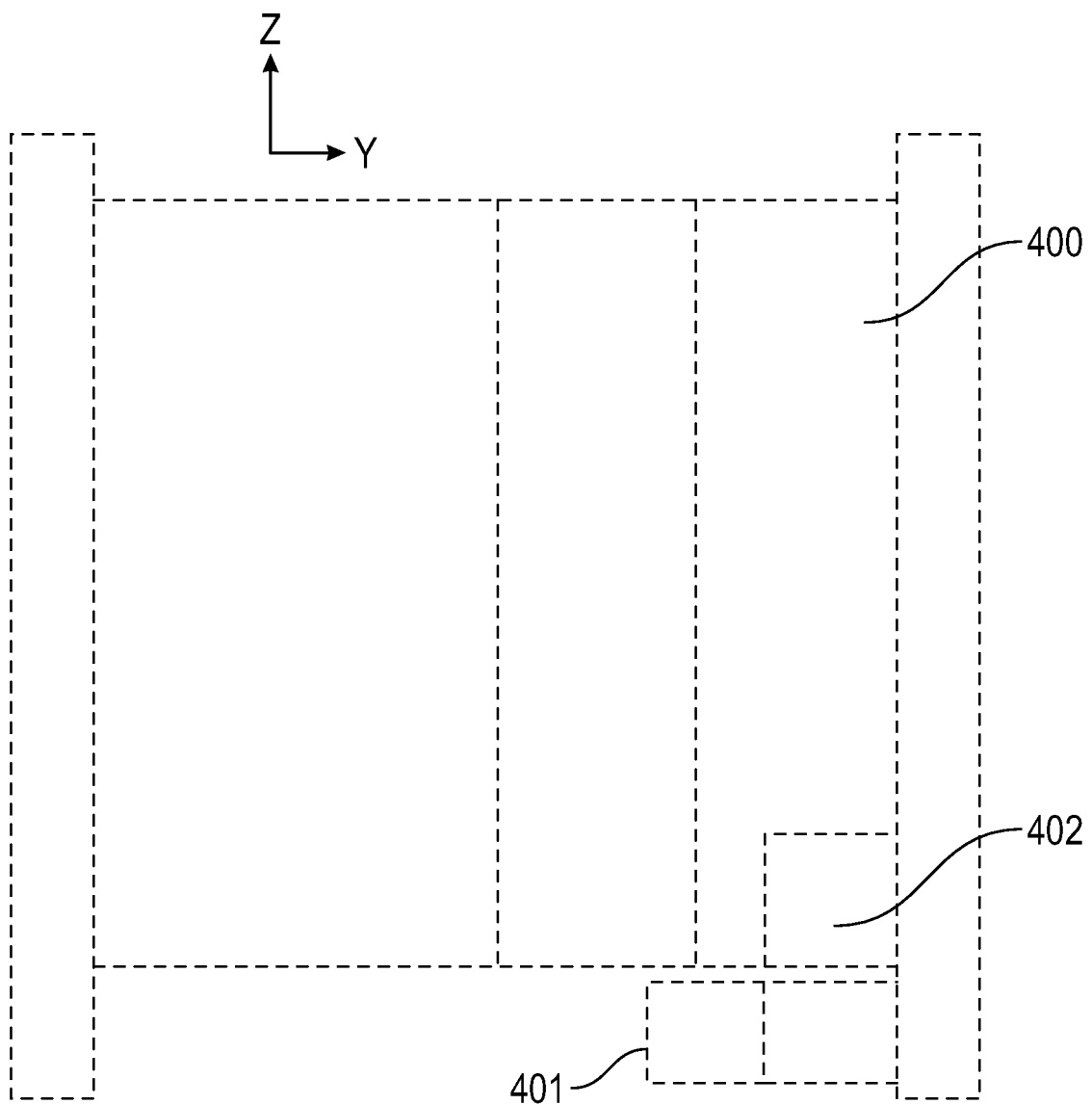
FIG. 4 illustrates a variation of a linking unit used in various types of molds.

In FIG. 4, positions of the linking unit 401 and the linking unit 402, which can be attached to a mold 400 are illustrated by dotted lines. The linking unit 401 and the linking unit 402 can be attached to molds of the same type and to molds of different types. This enables changing the linking unit that is attached to the mold based on the type of the mold or the variation of the linking unit.

Figure 5:
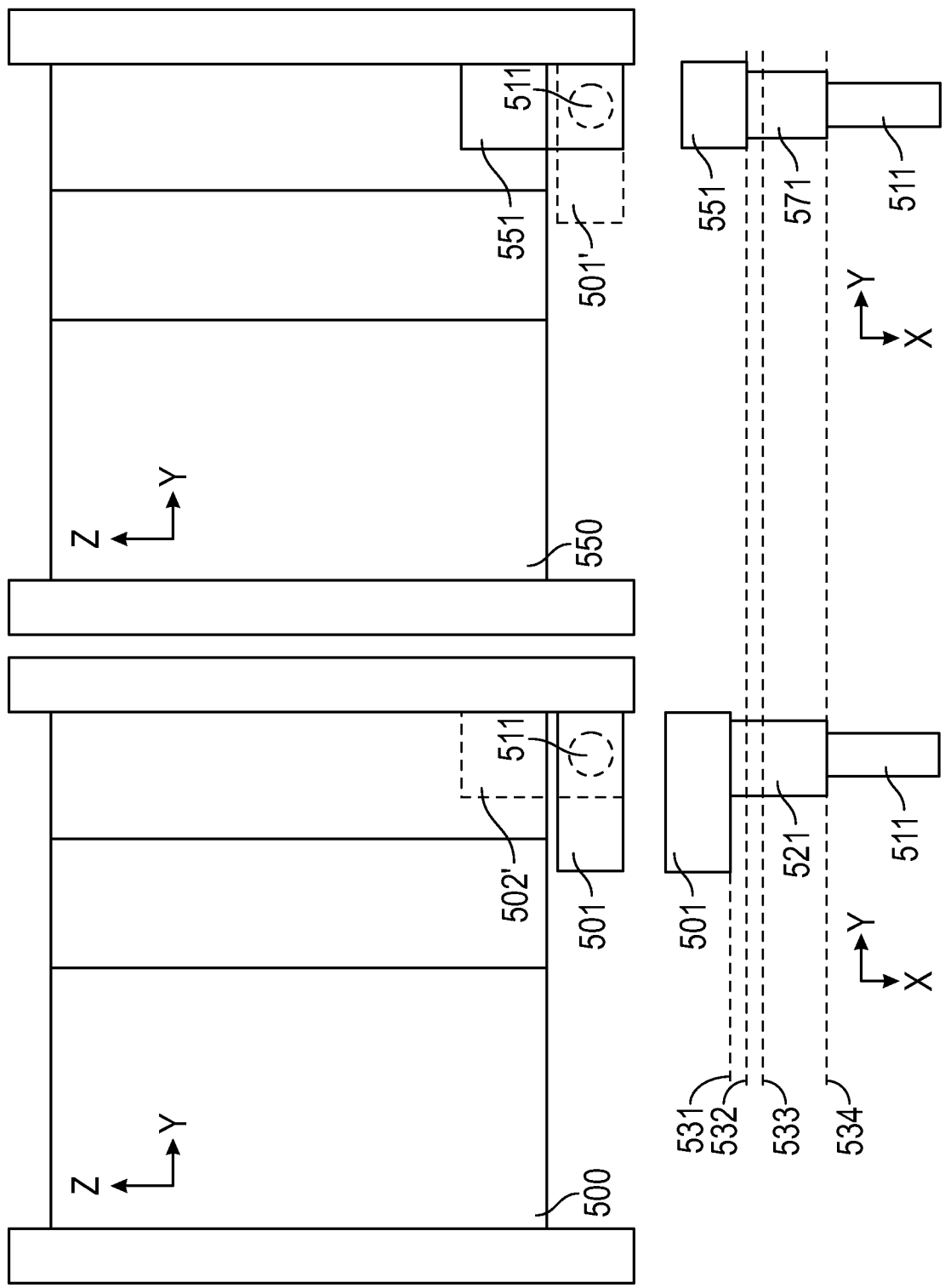
Figure 6:
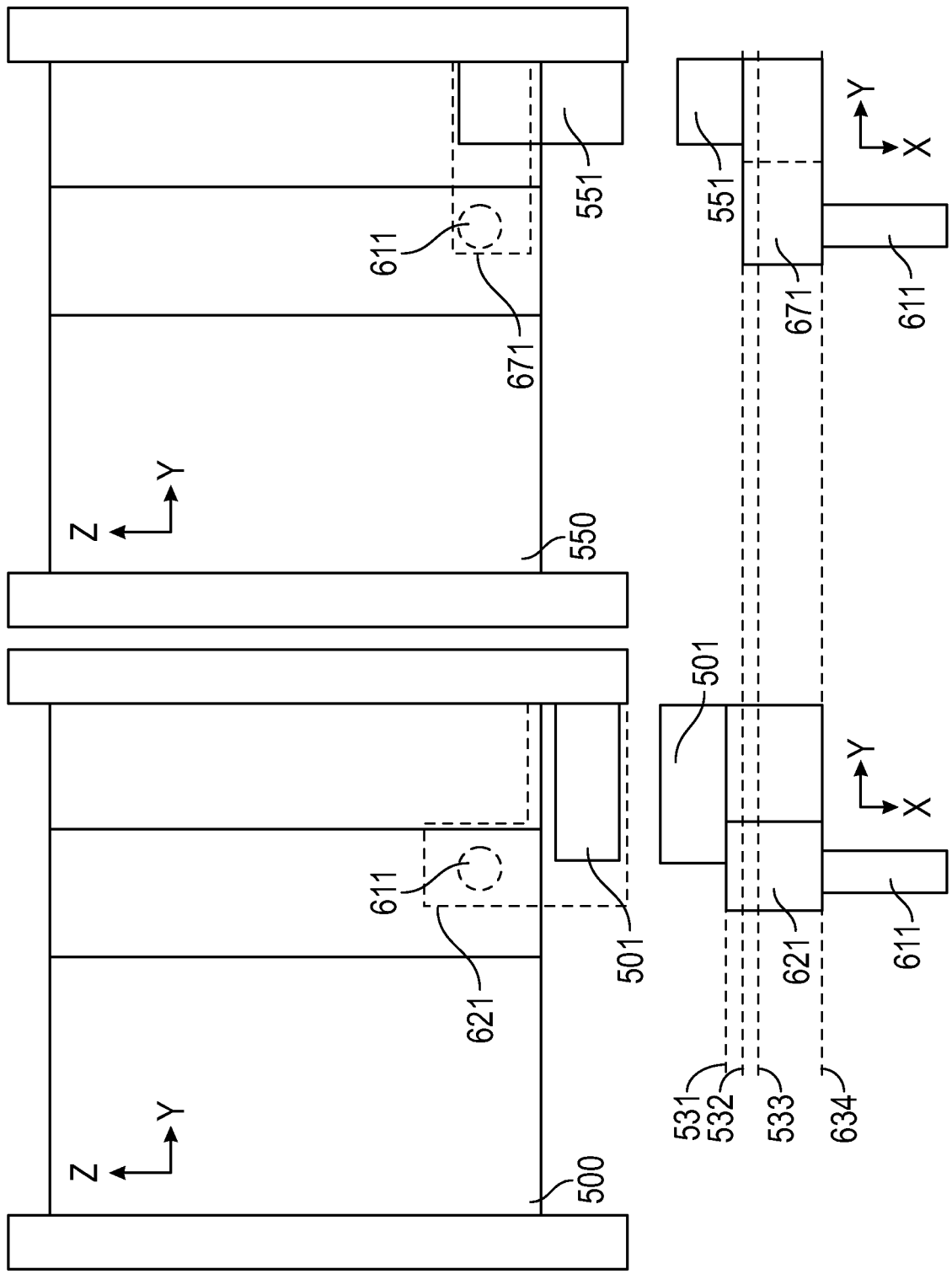

FIGS. 5-7 illustrate an attachment for fixing the rod of the conveyance unit 31 and the linking unit with each other that enables handling the variation of the linking unit.

FIG. 5 illustrates an attachment for connecting an actuator with a mold that is divided into three sections so that a cold runner can be provided in the mold. The upper left figure in FIG. 5 illustrates positional relationships of a mold 500, a linking unit 501, and a rod 511 of the actuator in the conveyance unit 31 that conveys the mold 500. The lower left figure in FIG. 5 illustrates an appearance, viewed from above in a vertical direction, of the linking unit 501, the rod 511, and an attachment 521 that fixes the rod 511 and the linking unit 501 to each other. The upper right figure in FIG. 5 illustrates positional relationships of a mold 550, a linking unit 551, and a rod 511 of the actuator in the conveyance unit 31 that conveys the mold 550. The lower right figure in FIG. 5 illustrates an appearance, viewed from above in the vertical direction, of the linking unit 551, rod 511, and an attachment 571 that fixes the rod 511 and the linking unit 551 to each other. Each of the molds 500 and 550 include the fixed mold and the movable mold as well as the clamping plates, similar to the mold 100 illustrated in FIG. 3.

In the figures on the left-side of FIG. 5, one side of the attachment 521 is fixed to the linking unit 501 that is fixed to the mold 500, and another side of the attachment 521 is attachably/detachably fixed to the rod 511 of the actuator in the conveyance unit 31. The attachment 521 is provided in the conveying machine 3. The linking unit 501 is, for example, located just below the fixed mold 101, similar to the linking unit 150 in FIG. 3A. The linking unit 501 positioned lengthwise in the Y-axis direction on the Y-Z plane.

In the figures on the right-side of FIG. 5, one side of the attachment 571 is fixed to the linking unit 551 that is fixed to the mold 550, and another side of the attachment 571 is attachably/detachably fixed to the rod 511 of the actuator in the conveyance unit 31. The attachment 571 is provided in the conveying machine 3. The linking unit 551 is located closer to the conveying machine 3 than the fixed mold 101. The linking unit 551 is positioned lengthwise in the Z-axis direction in the X-Z plane.

To illustrate examples of the positional relationships with respect to different linking units, an area 502' represents the area where a different linking unit occupies, while and an area 501' represents the area where a different linking unit occupies.

It is preferable that the conveying machine 3 can handle both the linking unit 501 and the linking unit that occupies area 502'. To achieve this, the conveying machine 3 is located so that, viewed in the X-axis direction, i.e., the conveyance direction of the mold 500, the center axis of the rod 511 overlaps an area where the linking unit always exists. In the figure on the left-side of FIG. 5, the area where the linking unit always exists is an area where the linking unit 501 and the area 502' overlap. By forming the linking unit of the mold so that areas area 502' and 501' always exist, the injection molding machine 2 with the conveying machine 3 is available.

In the figures in the lower part of FIG. 5, a position of an end surface of the mold 500/550 on a side of the conveyance unit 31 is illustrated by dotted line 533. A position of an end surface of the linking unit 501 on the side of the conveyance unit 31 is illustrated by dotted line 531. A position of an end surface of the linking unit 551 on the side of the conveyance unit 31 is illustrated by dotted line 532. A position of an end surface of the rod 511 on a side of the mold 500/550 is illustrated by dotted line 534.

A distance L1 between the dotted line 531 and the dotted line 533 is different from a distance L2 between the dotted line 532 and the dotted line 533. That is, the distance L1 between the end surface of the mold 500 and the end surface of the linking unit 501 is different than the distance L2 between the end surface of the mold 550 and the end surface of the linking unit 551. The difference of the distance is adjusted by the attachment 521 and the attachment 571. A thickness of the attachment 521 is different from a thickness of the attachment 571 in the X-axis direction. This difference of the thickness is equal to L1-L2. The distance between the end surface of the rod 511 and the end surface of the mold 500/550, which is connected with the rod 511, on the side of the conveying machine 3, is always constant. As a result, conveyance control for the mold 500/550 by the conveying machine 3 is standardized and simplified.

By providing attachments, which enable connecting a rod with different molds and different linking units, for each of the linking units, a plurality of molds can be used with a single conveying machine. This facilitates manufacturing conveying machines because standardization of the design for conveying machines can become possible. In addition, the usability of injection molding machines improves because a plurality of molds can be used in the injection molding machines regardless of what conveying machines are used.

FIG. 6 and FIG. 7 illustrate an additional example of an attachment for connecting a conveying machine with a mold. The upper left figure in FIG. 6 illustrates positional relationships of the mold 500, the linking unit 501, and the rod 611 of the actuator in the conveying machine that conveys the mold 500. The lower left figure in FIG. 6 illustrates an appearance, viewed from above in a vertical direction, of the linking unit 501, the rod 611, and an attachment 621 that fixes the rod 611 and the linking unit 501 to each other. The upper right figure in FIG. 6 illustrates positional relationships of a mold 550, a linking unit 551, and a rod 611 of the actuator in the conveying machine that conveys the mold 550. The lower right figure in FIG. 6 illustrates an appearance, viewed from above in the vertical direction, of the linking unit 551, rod 611, and an attachment 671 that fixes the rod 611 and the linking unit 551 to each other.

In the example illustrated in FIG. 6, the conveying machine is a conveying machine that is mainly used for a mold that is divided into three sections so that a cold runner can be provided in the mold. A position of the rod 611 of the actuator in the conveying machine is located closer to a fixed mold (not illustrated) than the middle of the mold 500/550 when viewed in the X-axis direction, i.e., the conveyance direction of the mold 500/550 or the longitudinal direction of the rod 611. The attachment 621 is an attachment that connects the rod 611 with the mold 500 that is divided into three sections, and the attachment 671 is an attachment that connects the rod 611 with the mold 550 that is divided into three sections.

In the example illustrated in the left-side of FIG. 6, the center axis of the rod 611 is at a position that is located at a −Y-axis direction side and a +Z-axis direction side (above in the vertical direction) relative to the linking unit 501. To compensate the positional deviation in a Y-axis direction and a Z-axis direction, the attachment 621 forms an L-shape, and an extending portion of the attachment 621 in the Z-axis direction and the rod 611 are fixed together. An extending portion of the attachment 621 in the Y-axis direction and the linking unit 501 are fixed together.

In the example illustrated in the right-side of FIG. 6, the center axis of the rod 611 is at a position that is located at a −Y-axis direction side (opening direction of the mold) relative to the linking unit 551. To compensate the positional deviation in a Y-axis direction, the attachment 621 has an extending portion in the Y-axis direction, and a −Y-axis side of the extending portion of the attachment 621 and the rod 611 are fixed together. A +Y-axis side of the extending portion of the attachment 621 and the linking unit 551 are fixed together.

In the example illustrated in the lower part of FIG. 6, the dotted lines 531, 532, 533 are the same as the dotted lines 531, 532, 533 illustrated in FIG. 5, but an end surface of the rod 611 on a side of the mold 500/550 is illustrated by a dotted line 634. A difference of the thickness is equal to L1-L2. The distance between the end surface of the rod 611 and the end surface of the mold 500/550, which is connected with the rod 611, on the side of the conveying machine is always constant. As a result, the conveyance control for the mold 500/550 by the conveying machine is standardized and simplified.

By providing the attachments, which enable connecting a rod with different molds and different linking units, for each of the linking units, a plurality of molds can be used with a single conveying machine. This facilitates manufacturing conveying machines because standardization of the design for conveying machines can become possible. In addition, the usability of injection molding machines improves because a plurality of molds can be used in the injection molding machines regardless of what conveying machines are used. The versatility of the conveying machines improve because the positional deviation between the center axis of the rod and the linking unit in the Y-axis and the Z-axis directions is compensated.

An upper figure in FIG. 7 illustrates positional relationships of a mold 700, which is divided into two sections, a rod 611 in a conveying machine, and a linking unit 701. A lower figure in FIG. 7 illustrates a physical connection relationship of the rod 611, the linking unit 701, and an attachment 721, which fixes the rod 611 and the linking unit 701 to each other. The mold 700 is divided into two sections to enable a hot runner to be provided in the mold 700. The mold 700 connects with a side surface of a fixed mold. The linking unit 701 is located at a position that corresponds to the rod 611, on the side surface of the mold 700. The linking unit 701 is connected with the attachment 721.

In the lower figure in FIG. 7, the side surface of the mold 700 on the side of the conveying machine is illustrated by the dotted line 533. The end surface of the rod 611 is illustrated by the dotted line 634. In a case where a distance L between the end surface of the rod 611 and the mold 700 is a unique value for the conveying machine, the thickness of the attachment 721 in the conveyance direction (X-axis direction) is set to the thickness that is obtained by subtracting the thickness of the linking unit 701 from the distance L.

Using the attachments 621, 671, and 721 enables execution of common control for conveying a mold regardless of the type of mold (divided number). More specifically, a distance between a center of a mold (or a position corresponding to a nozzle of the injection molding system) and the side surface of the mold is needed as a unique value of the mold. Other variations from a linking unit attached to the mold are compensated with a shape of an attachment. Therefore, conveyance control that does not depend on the variations can be realized.

As illustrated in FIG. 6, in a case where a center axis of a rod of an actuator and the linking unit do not overlap, there is a possibility that power transmitted from the actuator via the rod could influence conveyance of the mold. If this influence is unavoidable, it is preferable to use the conveying machine for the mold that is divided into three sections as illustrated in FIG. 5. If this influence does not become an issue, using the attachment illustrated in FIG. 6, the versatility of the conveying machine improves.

According to the above-described exemplary embodiments, the linking unit is located on a surface on which the fixed mold is located. According to another exemplary embodiment, the linking unit can be located on surfaces of the clamping plate 101a other than the surface that is in contact with the fixed platen 61 and is, for example, located on a side surface or a top surface of the clamping plate 61. The configuration in which the linking unit is attached on the side surface, i.e., a surface parallel to a Y-Z plane in FIG. 3B) may be useful for a mold in which a contacting area between the fixed mold 101 and the movable mold 102 is so large that the linking unit cannot be attached on a surface on which the fixed mold is located.

According to some of the above-described exemplary embodiments, the linking unit is provided at the mold and the attachment is provided between the rod and the linking unit. The attachment may not be needed if the linking unit is designed with standardization of connection between the linking part and the rod. The linking unit can be designed so that some parameters are standardized in various molds. The parameters can include an offset in the X-axis direction of the linking unit from the end face to be connected to the actuator, and a size and a position of an area of end face, in the Y-Z plane, of the linking unit. In this case, the linking unit functions as the attachment as well.

According to another exemplary embodiment, while there may be no attachment needed for a linking unit designed in consideration of the above-described standardization, an attachment is still needed for a special linking unit designed differently from the standardized linking unit due to some special attributes of a mold. According to yet another exemplary embodiment, a first type of attachment is used for molds with linking units designed in consideration of the standardization between the rod and the linking unit, and a second type of attachment is used for a mold with a special linking unit.

Figure 8A:
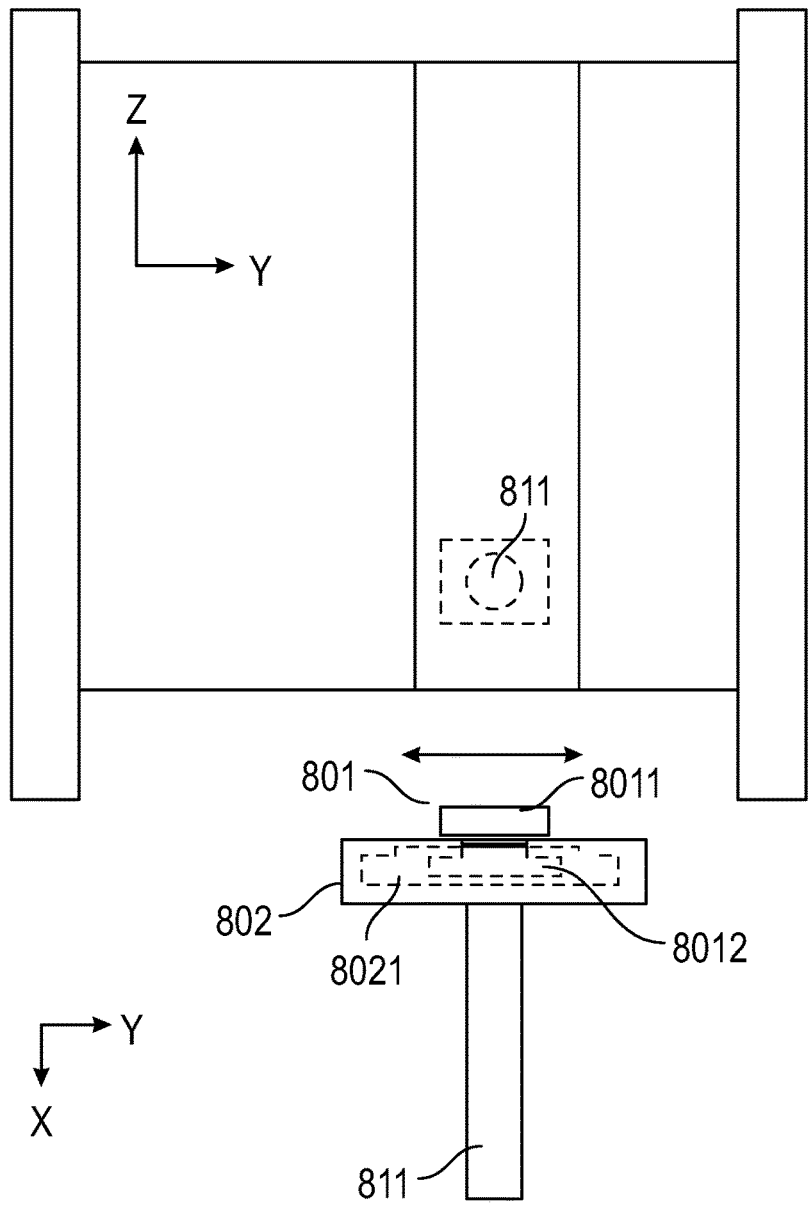
FIGS. 8A-8C illustrate an injection molding system.

Another exemplary embodiment is described with reference to FIGS. 8A-8C. The upper part of FIG. 8A is an illustration of the mold 100 viewed in an X-axis direction, which is a conveying direction of the mold. The lower part of FIG. 8A is an illustration of a rod 811 of an actuator, a linking unit 801 and a linking mechanism 802, viewed vertically from above. In the present embodiment, a linking unit 801 is fixed to the mold 100, and a linking mechanism 802 is fixed to the rod 811. The linking unit 801 is configured to be slidably engaged with the linking mechanism 802 in the Y-axis direction. The linking unit 801 can be, for example, fixed to a fixed mold, and does not need to be fixed to the clamping plate 101a, even though the mold is split into three sections when used.

The linking unit 801 includes a mold fix part 8011 fixed to the mold 100, with a cross-section S in the Y-Z plane, intersecting the conveying direction, and includes a slide part 8012 that is configured to be slidable with respect to the linking mechanism 802 in the Y-axis direction. The slide part 8012 also includes a first part having a cross-section S1 smaller than ae cross-section S, and includes a second part having a cross-section S2 larger than the cross-section S1. A majority of the first part and the entire second part are configured to exist in a hollow 8021 formed on the linking mechanism 802. The hollow 8021 includes an opening with a size corresponding to the first part, and an inner area with a size to accommodate the second part.

Figure 8B:
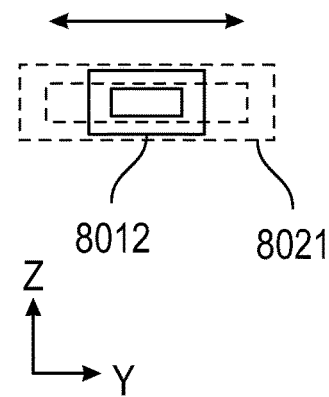
Figure 8C:
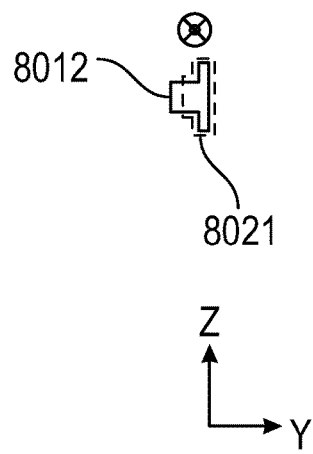

FIGS. 8B and 8C illustrate the mold fix part 8011 in solid lines and the hollow 8021 in dotted lines. FIG. 8B illustrates the cross-section of a plane parallel to the Y-axis and intersecting the central axis of the rod 811, FIG. 8C illustrates the cross-section of a plane parallel to the X-axis and intersecting the central axis of the rod 811. As illustrated in FIGS. 8B and 8C, the width of the opening in the Z-axis direction is larger than the width of the first part of the slide part 8012 in the Z-axis direction, but smaller than the width of the second part in the Z-axis direction, which restricts the movement of the slide part in the X-axis and Z-axis directions. Both the width of the opening and the inner area in the Y-axis direction are larger than each of the widths of the first part and the second part in the Y-axis direction, which enables the slide part 8012 to slide in the Y-axis direction.

The linking mechanism 802 of the exemplary embodiments can also include one or more stoppers (not illustrated) insertable into and retractable from the inner area. The movement of the slide part 8012 in the Y-axis direction can be restricted by inserting the stopper when the mold 100 is being conveyed. This prevents the linking unit 801 from sliding more than expected.

The linking unit 801 and the linking mechanism 802 enable the linking unit 801 to slide with respect to the linking mechanism 802 while the connection between the linking unit 801 and the linking mechanism 802 exists, even though the fixed mold 101 is spaced apart in a predetermined distance from the fixed platen 61. This structure enables the central axis of the rod 811 to be located near the center plane of the mold 100, which reduces the force applied from the rod 811 to the mold 100. The center plane is a plane parallel to the X-Z plane (parallel to the fixed platen 61 and the moveable platen 62) and intersecting the center of the mold 100.

According to still another exemplary embodiment, the linking unit 801 can be fixed on the movable mold 102 or the clamping plate 102*a* on the movable mold's 102 side. The slidable range of the slide part 8012 may need to be greater than that of the slide part attached on the fixed mold 101.

According to still yet another exemplary embodiment, a connection mechanism can be provided between the mold 100A/100B and the rod of the actuator to automatically engage and/or disengage the mold 100A/100B and the rod. The connection mechanism can include a lock mechanism configured to be locked and unlocked electronically. For example, the control apparatus 4 instructs the lock mechanism to disengage the connection between the mold and the rod in response to an operator's selection of a switch, after the conveying machine 3 finishes conveying the mold into the molding operation position 11 in the injection molding machine 2. The control apparatus 4 instructs the lock mechanism to engage the connection between the mold 100A/100B and the rod in response to an operator's selection of another switch, after the injection molding with the mold 100A/100B is completed. With this configuration the linking unit can be attached on components other than the clamping plate 101*a*, which are spaced apart from the fixed platens 61.

Definitions

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Combinations of any exemplary embodiments disclosed above are also included as embodiments of the present disclosure. While the above-described exemplary embodiments discuss illustrative embodiments, these embodiments are not seen to be limiting.

What is claimed is:

1. A mold for an injection molding system including an injection molding machine, a conveying apparatus configured to convey a mold to a molding operation position in the injection molding machine, and a driving unit configured to provide power for moving the mold, the mold comprising:

a fixed mold;
a movable mold; and
a clamping plate fixed to the fixed mold,
wherein the improvement to the mold includes:
a first attachment area for transmitting the power from the driving unit to the mold, wherein the fixed mold is fixed to a first surface of the clamping plate, wherein part of the first surface forms a border area between the fixed mold and at least one edge of the clamping plate, wherein the first attachment area is provided on the border area of the first surface of the clamping plate such that the attachment area is positioned in the border area on the first surface between the mold and the edge of the clamping plate, wherein the first attachment area is located lower than a middle of the clamping plate in the vertical direction in a condition where the mold is used in the injection molding system, and
wherein the first attachment area is connectable to a linking unit that is configured to transmit the power from the driving unit to the mold such that the first attachment area affords interchangeability of the linking unit.

2. The mold according to claim 1, wherein a second attachment area for connecting with another mold is provided on the clamping plate.

3. An injection molding system comprising:
an injection molding machine;
a conveying apparatus configured to convey a mold to a molding operation position in the injection molding machine;
the mold, wherein the mold includes including a fixed mold, a movable mold, and a clamping plate fixed to the fixed mold; and
a driving unit configured to provide power for moving the mold,
wherein the improvement to the injection molding system includes:
a first attachment area for transmitting the power from the driving unit to the mold, wherein the fixed mold is fixed to a first surface of the clamping plate, wherein part of the first surface forms a border area between the fixed mold and at least one edge of the clamping plate, wherein the first attachment area is provided on the border area of the first surface of the clamping plate such that the attachment area is positioned in the border area on the first surface between the mold and the edge of the clamping plate, wherein the first attachment area is located lower than a middle of the clamping plate in the vertical direction in a condition where the mold is used in the injection molding system,
wherein the first attachment area is connectable to a linking unit that is configured to transmit the power from the driving unit to the mold such that the first attachment area affords interchangeability of the linking unit.

4. The injection molding system according to claim 3, wherein a second attachment area for connecting with another mold is provided on the clamping plate.

5. The mold according to claim 1, wherein the movable mold includes:
a first movable mold; and
a second movable mold provided between the fixed mold and the first movable mold,
wherein, when viewed in the conveyance direction of the mold, the linking unit is configured to extend over a boundary line between the fixed mold and the second movable mold from the clamping plate towards the second movable mold.

6. The mold according to claim 5, wherein the first movable mold and the second movable mold are configured to form a first cavity, and the second movable mold and the fixed mold are configured to form a second cavity, and
wherein a molded part is formed in the first cavity and the second cavity respectively.

7. The mold according to claim 5, further comprising a cold runner.

8. The injection molding system according to claim 3, wherein the movable mold includes:
a first movable mold, and
a second movable mold which is provided between the fixed mold and the first movable mold,
wherein, when viewed in the conveyance direction of the mold, the linking unit is configured to extend over a boundary line between the fixed mold and the second movable mold from the clamping plate towards the second movable mold.

9. The injection molding system according to claim 8, wherein the first movable mold and the second movable mold are configured to form a first cavity, and the second movable mold and the fixed mold are configured to form a second cavity, and
wherein a molded part is formed in the first cavity and the second cavity respectively.

10. The injection molding system according to claim 8, further comprising a cold runner.

11. The mold according to claim 1, wherein the first surface is a planar surface.

12. The mold according to claim 1, wherein the border area surrounds the attachment area.

13. The mold according to claim 1,
wherein, when viewed in a direction perpendicular to a conveyance direction of the mold, the first surface has a quadrilateral shape, and
wherein the attachment area lies within the quadrilateral shape.

14. The mold according to claim 1, wherein the attachment area includes a structure that can be attached to the linking unit.

15. The mold according to claim 14, wherein the structure is a screw.

16. The mold according to claim 1, wherein, when viewed in the conveyance direction of the mold, the linking unit is configured to extend over a boundary line between the fixed mold and the movable mold from the clamping plate towards the movable mold.

* * * * *